United States Patent
Tng

(10) Patent No.: US 9,173,161 B2
(45) Date of Patent: Oct. 27, 2015

(54) PEER-TO-PEER PRE-ASSOCIATION DISCOVERY OPERATIONS

(71) Applicant: QUALCOMM Incorporated, San Diego, CA (US)

(72) Inventor: Seng Khoon Tng, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 13/786,799

(22) Filed: Mar. 6, 2013

(65) Prior Publication Data

US 2014/0258395 A1 Sep. 11, 2014

(51) Int. Cl.
| | |
|---|---|
| G06F 15/16 | (2006.01) |
| H04W 48/16 | (2009.01) |
| H04L 29/08 | (2006.01) |
| H04W 8/00 | (2009.01) |

(52) U.S. Cl.
CPC ............ *H04W 48/16* (2013.01); *H04L 67/104* (2013.01); *H04L 67/16* (2013.01); *H04W 8/005* (2013.01)

(58) Field of Classification Search
CPC .............................. H04L 67/104; H04L 67/16
USPC ................................................. 709/203, 204
See application file for complete search history.

(56) References Cited

U.S. PATENT DOCUMENTS

| | | | |
|---|---|---|---|
| 8,243,623 B2 | 8/2012 | Gong et al. | |
| 2007/0233879 A1* | 10/2007 | Woods et al. | 709/227 |
| 2010/0322213 A1 | 12/2010 | Liu et al. | |
| 2012/0084364 A1 | 4/2012 | Sivavakeesar | |
| 2012/0096184 A1* | 4/2012 | Lambert et al. | 709/245 |

FOREIGN PATENT DOCUMENTS

WO 2012115385 A2 8/2012

OTHER PUBLICATIONS

International Search Report and Written Opinion—PCT/US2014/018958—ISA/EPO—Jun. 16, 2014.
Peters A., et al., "Time Efficient Service Discovery in Mobile P2P Architectures Using Bluetooth", Database and Expert Systems Application, 2008. DEXA '08. 19th International Conference On, IEEE, Piscataway, NJ, USA, Sep. 1, 2008, pp. 347-351, XP031320672, ISBN: 978-0-7695-3299-8.
Wi-Fi Alliance: "Wi-Fi Peer-to-Peer (P2P) Specification v1.1 ", Wi-Fi Alliance Specification, Jan. 1, 2010, pp. 1-159, XP009163866.
Yuan Yuan et al., "A Secure Service Discovery Protocol for MANET," The 14th IEEE 2003 International Symposium on Personal, Indoor and Mobile Radio Communication Proceedings, pp. 502-506.

* cited by examiner

*Primary Examiner* — Adnan Mirza
(74) *Attorney, Agent, or Firm* — Mahamedi Paradice LLP

(57) ABSTRACT

A method for discovering P2P service capabilities of peer devices in a Wi-Fi network is disclosed. A client device scans one or more channels of the P2P network to discover peer devices, and receives one or more data frames from a set of peer devices. Each of the data frames includes management information to enable the client device to establish a connection with a corresponding peer device. Each data frame further includes a first set of service information, which includes data indicating whether the corresponding peer device is configured to provide a P2P service. The client device then selectively establishes a P2P connection with a peer device from the set based, at least in part, on the first set of service information.

40 Claims, 12 Drawing Sheets

PEER-TO-PEER PRE-ASSOCIATION DISCOVERY OPERATIONS

TECHNICAL FIELD

The present embodiments relate generally to wireless peer-to-peer networks, and specifically to pre-association discovery of services provided by Wi-Fi devices.

BACKGROUND OF RELATED ART

The Wi-Fi Alliance Peer-to-Peer (P2P) Specification, also known as "Wi-Fi Direct," allows for pre-association service discovery among peer devices. This protocol enables a client device or station (STA) to query peer STAs within Wi-Fi range to determine what services, if any, are provided by the peer STAs. Examples of such services may include: printing, gaming, file sharing, and/or Internet gateway services. Determining the services provided by peer STAs typically requires at least two phases of communications: a device discovery phase, followed by a service discovery phase.

During the device discovery phase, a client STA (e.g., a STA requesting a particular P2P service) determines the identity and/or availability of other STAs within Wi-Fi communication range. The client STA typically does this by "scanning" the 3 social channels (e.g., channels 1, 6, and 11 in the 2.4 GHz band) for incoming beacon frames and/or by broadcasting probe request frames to any STAs that may be listening on those channels. Thereafter, during the service discovery phase, the client STA queries the available peer STAs (discovered during the device discovery phase) about the services they provide. The client STA typically transmits service discovery requests to each peer STA that supports the service discovery operation, one at a time, until the client STA identifies a peer STA that provides the requested service.

Thus, during the service discovery phase, the client STA often queries several peer STAs (some of which may not provide any P2P services) before identifying a peer STA that provides the requested service. This is because the client STA is typically unaware of which services (if any) each of the peer STAs provides until after the service discovery phase. Furthermore, the client STA typically has no knowledge of whether the services provided by previously discovered peer STAs have changed unless it periodically repeats the service discovery operation (and device discovery operation) with each peer STA. Thus, a substantial amount of time and resources may be consumed in finding a peer STA that provides a desired service.

BRIEF DESCRIPTION OF THE DRAWINGS

The present embodiments are illustrated by way of example and are not intended to be limited by the figures of the accompanying drawings, where.

DETAILED DESCRIPTION

The present embodiments are described below in the context of pre-association service discovery operations performed by and between Wi-Fi enabled devices for simplicity only. It is to be understood that the present embodiments are equally applicable for performing pre-association service discovery operations using signals of other various wireless standards or protocols. As used herein, the terms WLAN and Wi-Fi can include communications governed by the IEEE 802.11 standards, Bluetooth, HiperLAN (a set of wireless standards, comparable to the IEEE 802.11 standards, used primarily in Europe), and other technologies used in wireless communications. Further, the term "client device" refers to a wireless device requesting a particular service in a peer-to-peer (P2P) network, and the term "peer device" refers to a wireless device that is discoverable by the client device in the P2P network. The terms "device" and "station" (or STA) may be used interchangeably herein.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

Figure 1A:
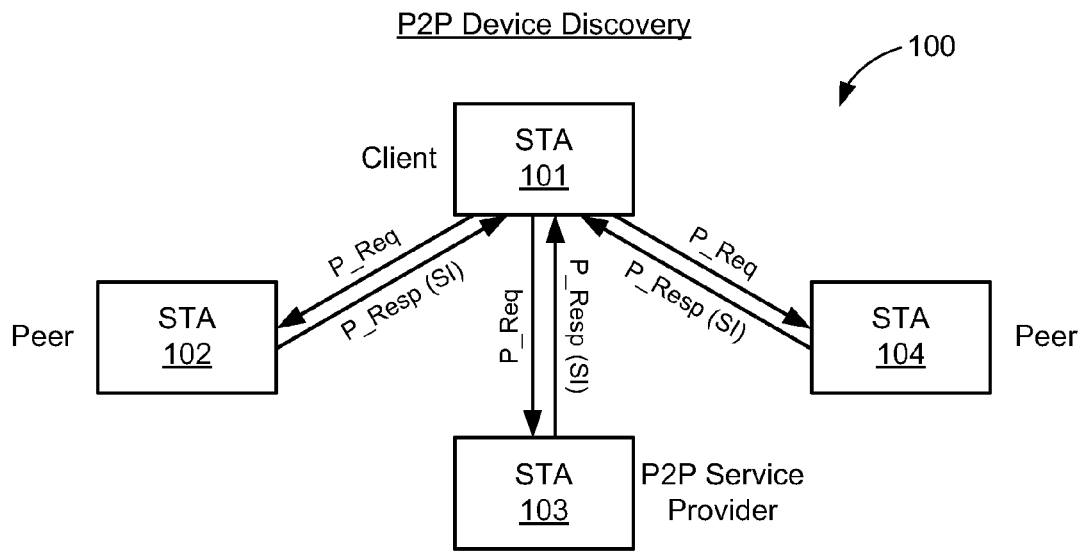
FIGS. 1A-1B depict a peer-to-peer (P2P) Wi-Fi system within which the present embodiments may be implemented.
Figure 1B:
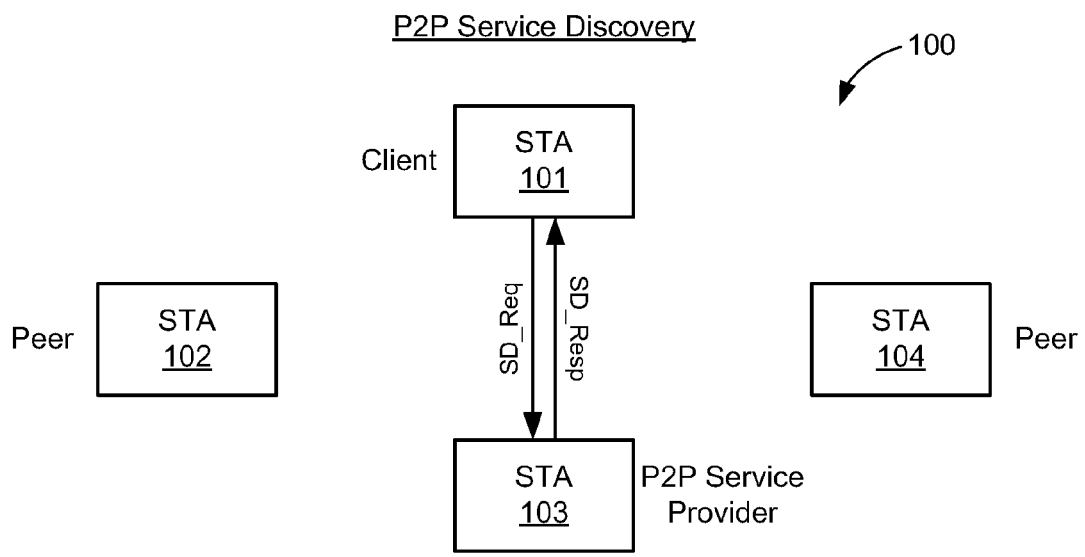

FIGS. 1A-1B depict a peer-to-peer (P2P) Wi-Fi system 100 within which the present embodiments may be implemented. System 100 is shown to include a client station (STA) 101 located within Wi-Fi communication range of a number of peer STAs 102-104. Although only three peer STAs 102-104 are shown in FIGS. 1A-1B for simplicity, it is to be understood that the Wi-Fi system 100 may include any number of peer STAs. The STAs 101-104 are configured to communicate with one another in a P2P fashion, over a Wi-Fi medium (or channel). More specifically, without the assistance of an access point, the client STA 101 may identify or discover each of the peer STAs 102-104, and then establish a direct P2P connection with a selected one of the peer STAs 102-104.

The client STA 101 may initiate a device discovery operation, as shown in FIG. 1A, by scanning the social channels (e.g., channels 1, 6, and 11 in the 2.4 GHz band) used for Wi-Fi communications. For example, the client STA 101 may broadcast probe request (P_Req) frames on each of the social channels and listen for probe response (P_Resp) frames transmitted by the peer STAs 102-104 in response to the P_Req frames. The P_Req frames include management information that may be used by the peer STAs 102-104 to determine whether the client STA 101 may establish a communications link with a corresponding one of the peer STAs 102-104. Similarly, the P_Resp frames also include management information that may be used by the client STA 101 to identify and match parameters with a corresponding one of the peer STAs 102-104. The management information associated with each of the STAs 101-104 may include, for example, a MAC address and the data rates supported by the corresponding STA.

In accordance with the present embodiments, the P_Req frame may also include a list of one or more Service Query Strings that identify one or more corresponding services provided by the client STA 101. These Service Query Strings, if presented to the client STA 101 during the service discovery phase, would have valid Service Response Strings to indicate that STA 101 can support these services. Conversely, if the client STA 101 has invalid or empty Service Response Strings for any given Service Query String, this indicates that it does not support the corresponding service. For some embodiments, each Service Query String may identify a particular service provided by the client STA 101. Further, because each peer STA may store a list of Supported Service Query Strings for which it has a corresponding Service Response String(s), the list of Supported Service Query Strings stored within a particular peer STA may indicate which services are supported by the particular peer STA. In this manner, the client STA 101 may determine which services are supported by each of the nearby peer STAs 102-104 prior to commencing service discovery operations, which as described in more detail below may allow the client STA 101 to initiate service discovery operations with a selected subset of the peer STAs. Thus, by initiating service discovery operations with only the peer STAs that have been determined (during the device discovery phase) to support one or more services to be requested by the client STA 101, the time and/or resources associated with establishing a P2P connection with a selected peer STA may be reduced (e.g., as compared with conventional P2P discovery operations).

For some embodiments, each peer STA may respond only to those Service Query Strings that identify a service that is supported by the peer STA. For example, suppose the client STA 101 sends a P_Req frame containing (i) a first Service Query String corresponding to a printing service and (ii) a second Service Query String corresponding to a gaming service. If the peer STA 103 supports printing services but not gaming services, then the peer STA 103 may send a P_Resp frame containing a Service Response String corresponding to the printing service (but not a Service Response String corresponding to the gaming service).

For at least some embodiments, each Service Query String may be hashed to generate a corresponding hash value, and a list of such hash values identifying the services provided by the client STA 101 may be provided within the P_Req frames (e.g., rather than a list of un-compressed Service Query Strings). Each peer STA that receives such a P_Req frame may respond by sending a P_Resp frame that includes a list of hash values indicating which services the peer STA supports. Thereafter, the client STA may compare the list of desired hash values with the list of hash values received from the peer STA to determine which wanted services may be supported by the peer STA. Providing a list of hash values in the P_Req and P_Resp frames (rather than a list of un-compressed Service Query Strings) may limit the size of the P_Req and P_Resp frames to a value that allows service information to be exchanged between P2P devices during the device discovery phase.

The client STA 101 may then initiate a service discovery operation, as shown in FIG. 1B, with one or more of the peer STAs 102-104 based, at least in part, upon a determination of which services are supported by each of the peer STAs 102-104. For example, the client STA 101 may send service discovery request (SD_Req) frames to one or more of the peer STAs 102-104 to request one or more specific services supported thereby. Each of the peer STAs 102-104 may respond to a received SD_Req frame, if any, by transmitting a service discovery response (SD_Resp) frame back to the requesting client STA 101. The client STA 101 may then analyze each of the SD_Resp frames to confirm whether a corresponding peer STA may provide the particular service that the client STA 101 is requesting. For example, depending on the request, the SD_Resp frame may include a detailed list of all the services offered or supported by a peer STA and/or confirmation as to whether the peer STA is able to provide the particular service requested by the client STA 101.

For some embodiments, the SD_Req frame may include a Service Query String that requests certain P2P services such as, for example, Universal Plug and Play (UPnP) and/or Bonjour services. For such embodiments, the peer STAs 102-104 may determine whether they support the Service Query String, and if so, may generate one or more Service Response Strings. The Service Response Strings may be transmitted to the client STA 101 as part of the SD_Resp frame (or in any other suitable response frame).

If the client STA 101 determines or confirms that one of the peer STAs 102-104 provides the requested service, the client STA 101 may then establish a P2P connection with that peer STA using the management information provided by the peer STA. If the client STA 101 determines that more than one of the peer STAs 102-104 is able to provide the requested service, the client STA 101 may provide a user with an option to choose which, if any, of the peer STAs to establish a connection with.

Figure 2:
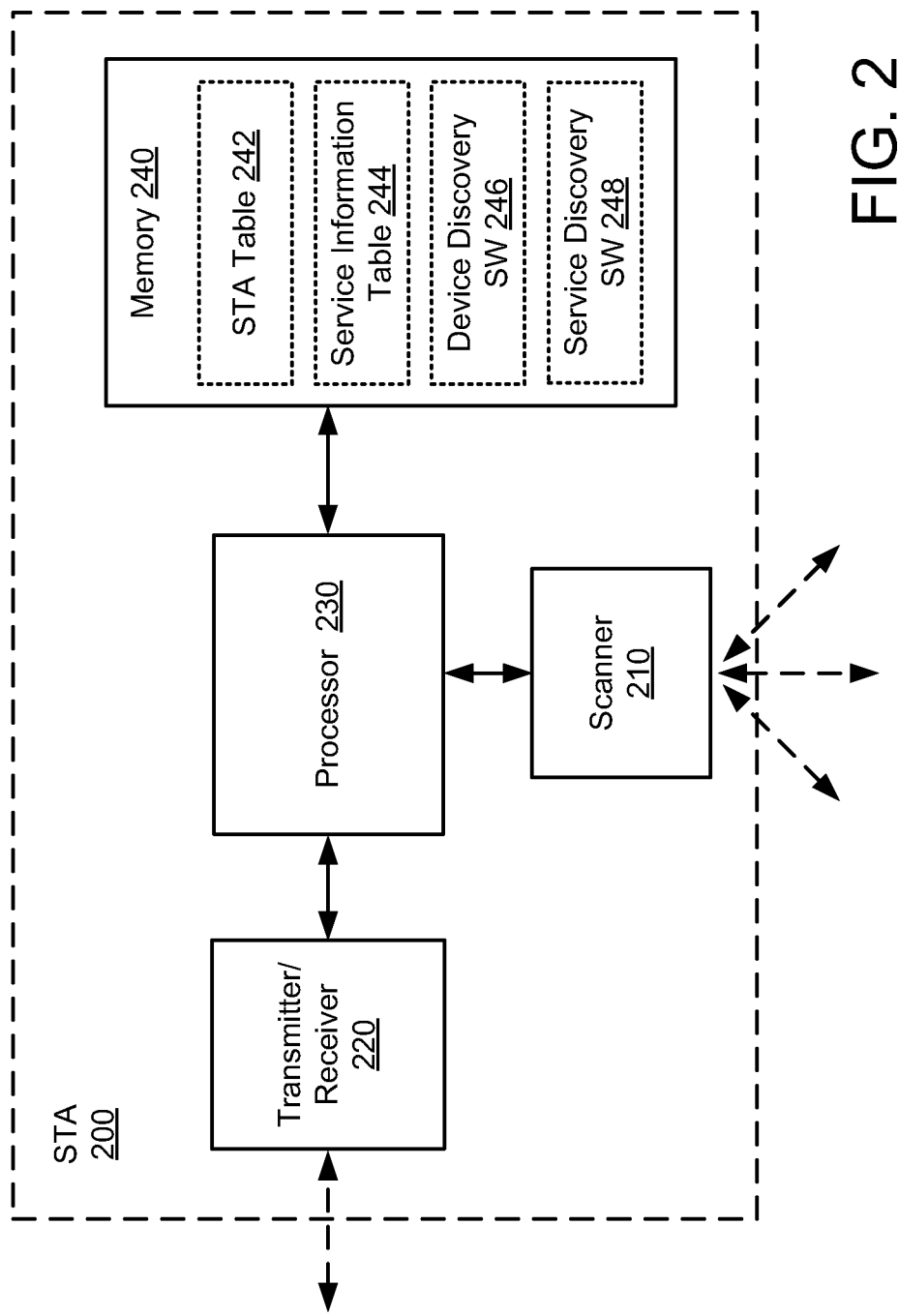
FIG. 2 shows a block diagram of a wireless station (STA) in accordance with some embodiments.

FIG. 2 shows a STA 200 that is one embodiment of the STAs 101-104 of FIGS. 1A-1B. The STA 200 includes a scanner 210, a transmitter/receiver circuit 220, a processor 230, and a memory 240. Scanner 210 may be used to scan the surrounding environment to detect and identify nearby peer STAs (e.g., peer STAs within range of the STA 200). For some embodiments, the scanner 210 may search for nearby peer STAs by periodically broadcasting P_Req frames. Further, the scanner 210 may also search for peer STAs by listening for beacon frames and/or P_Resp frames from neighboring devices. The transmitter/receiver (or "transceiver") circuit 220 may then be used to transmit signals to and receive signals from the discovered peer STAs.

Memory 240 may include a STA table 242 that can be used as a local cache to store the MAC addresses (or other suitable identifying information) of a plurality of peer STAs, the location coordinates of such STAs, P2P services supported by the STAs, and other suitable location or configuration information pertaining to any discovered peer STAs. For some embodiments, each entry of the STA table 242 includes a peer device field to store the name of the associated STA, an address field to store the MAC address of the STA, a coordinate field to store the location coordinates of the STA, and a service field to store information about the P2P services (if any) the STA is configured to provide. The STA table 242 may also store, for each associated peer STA, a list of hash values corresponding to a number of Service Query Strings identifying which services are supported by the peer STA and/or a list of services supported by the peer STA.

Memory 240 may also include a service information table 244 that can be used to store service information about the STA 200. For some embodiments, the service information table 244 may include a detailed list of the services that the STA 200 is configured to support, a list of different service types supported by the STA 200, and/or information regarding updates or changes to one or more services provided by the STA 200. The service information table 244 may also store a list of hash values corresponding to a number of Service Query Strings identifying one or more services provided by the STA 200, and/or may also store the actual Service Query Strings.

Furthermore, memory 240 may also include a non-transitory computer-readable storage medium (e.g., one or more nonvolatile memory elements, such as EPROM, EEPROM, Flash memory, a hard drive, etc.) that may store the following software modules:
  a P2P device discovery software module 246 to determine the location and identity of nearby peer STAs, as well as information about any P2P services that such peer STAs may provide (e.g., using information parsed from management frames exchanged during a device discovery operation); and
  a P2P service discovery software module 248 to determine or confirm, for each of the discovered peer STAs, whether one or more services provided and/or requested by that STA matches one or more services provided and/or requested by the STA 200.

Each software module includes instructions that, when executed by processor 230, may cause the STA 200 to perform the corresponding function. Thus, the non-transitory computer-readable storage medium of memory 240 may include instructions for performing all or a portion of the operations described with respect to FIGS. 3, 4, and 7.

Processor 230, which is coupled to the scanner 210, transceiver 220, and memory 240, may be any suitable processor capable of executing scripts of instructions of one or more software programs stored in the STA 200 (e.g., within memory 240). For example, processor 230 may execute the device discovery software module 246 and/or the service discovery software module 248. The device discovery software module 246 may be executed by the processor 230 to discover other nearby STAs, as well as to retrieve information about the services the nearby STAs may provide. For one example, the device discovery software module 246 as executed by processor 230 may generate P_Req frames including a list of hash values corresponding to one or more Service Query Strings, and/or may generate P_Resp frames including a list of hash values corresponding to one or more Service Query Strings, as described above. For another example, the device discovery software module 246 as executed by processor 230 may generate P_Req frames and/or listen for beacon frames broadcast by group owners (e.g., as discussed below with reference to FIGS. 6A-6B and 7). The P_Req frames may include management information identifying one or more communication capabilities of the STA 200.

The device discovery module 246 as executed by the processor 230 may parse the received P_Resp frames for management information as well as service information (SI) data, and update the STA table 242 accordingly. For example, the processor 230, in executing the device discovery software module 246, may determine whether the peer STA has previously been discovered by the STA 200 (e.g., based on the MAC address associated with the P_Resp frame). If no such MAC address exists in the STA table 242, the processor 230 may create a new entry in the STA table 242 for the newly discovered STA, and record the management information and SI data in the appropriate fields. Otherwise, the processor 230 may simply update the information in the STA table 242 for a previously-discovered peer STA.

For example, when the STA 200 receives a probe request from another STA, the device discovery software module 246 as executed by processor 230 may parse the management information included in the P_Req frame to determine whether the STA 200 supports one or more types of communications specified in the probe request. If the STA 200 is capable of establishing a connection with the requesting STA, the device discovery software module 246 as executed by processor 230 may generate a P_Resp frame to be transmitted back to the requesting device. The P_Resp frame may include both management information and SI data (e.g., retrieved from the service information table 244). For example, the SI data may be added to the information elements provided in the frame body of one or more P_Resp frames.

For some embodiments, the device discovery software module 246 may encode SI data (e.g., retrieved from the service information table 244) into the P_Req frames and/or the P_Resp frames. This may allow all discoverable STAs to exchange SI data, and/or update their corresponding STA tables, during the device discovery phase. As described above, this may allow the requesting STA to determine which services are supported by each of the discovered peer STAs prior to initiating service discovery operations, which in turn may allow the requesting STA to selectively initiate service discovery operations with only those peer STAs that support one or more services to be requested by the requesting STA. For some embodiments, the device discovery software module 246 may also encode group service information (GSI) data into beacon frames and/or P_Resp frames transmitted by the STA 200. As discussed below, with reference to FIGS. 6A-6B and 7, the GSI data may advertise the P2P service capabilities for multiple members of a P2P group, and may also be retrieved from the service information table 244.

The service discovery software module 248 may be executed by processor 230 to determine or confirm which, if any, of the discovered peer STAs is configured to provide a particular service. For example, the service discovery software module 248 as executed by processor 230 may selectively generate one or more SD_Req frames to be transmitted to one or more respective peer STAs based on service information stored in the service fields of the STA table 242. More specifically, SD_Req frames may be generated only for peer STAs matching certain service criteria (e.g., such that no SD_Req frames are generated for peer STAs that do not provide any P2P services). The scanner 210 and/or transceiver 220 may be used to transmit the SD_Req frames to the intended peer STAs, as well as to listen for corresponding SD_Resp frames from such STAs. The service discovery module 248 as executed by processor 230 may then parse the received SD_Resp frames for detailed service information to determine or confirm which, if any of the peer STAs is capable of providing a particular P2P service, and may then update the STA table 242 accordingly.

When the STA 200 receives a service discovery request from another STA, the service discovery software module 248 as executed by processor 230 may analyze the received SD_Req frame and generate a SD_Resp frame that is responsive to one or more service-related inquiries provided with the service discovery request. For example, each SD_Req frame may include an inquiry for more detailed information about the services provided by the STA 200 and/or a request for a particular P2P service. The service discovery software module 248 as executed by processor 230 may thus encode into the SD_Resp frame a detailed list of the services supported by the STA 200 and/or a confirmation as to whether the STA 200 is capable of providing a particular P2P service (e.g., based on information retrieved from the service information table 244).

For some embodiments, the SD_Req frame may contain one or more Service Query Strings. Each peer device that receives such an SD_Req frame may analyze the one or more Service Query Strings contained therein to determine whether the peer device provides the requested services (or equivalent services) indicated by the Service Query String. If the peer device provides the requested services, then the peer device may generate and transmit one or more Service Response Strings confirming the availability of the one or more requested services. Conversely, if the peer device does not provide the requested services, then the peer device may not transmit any Service Response Strings. Because each peer device may store a list of Supported Service Query Strings for which it has a corresponding Service Response String(s), the list of Supported Service Query Strings stored within a particular peer device may indicate whether the particular peer device provides one or more of the supported services.

Figure 3:
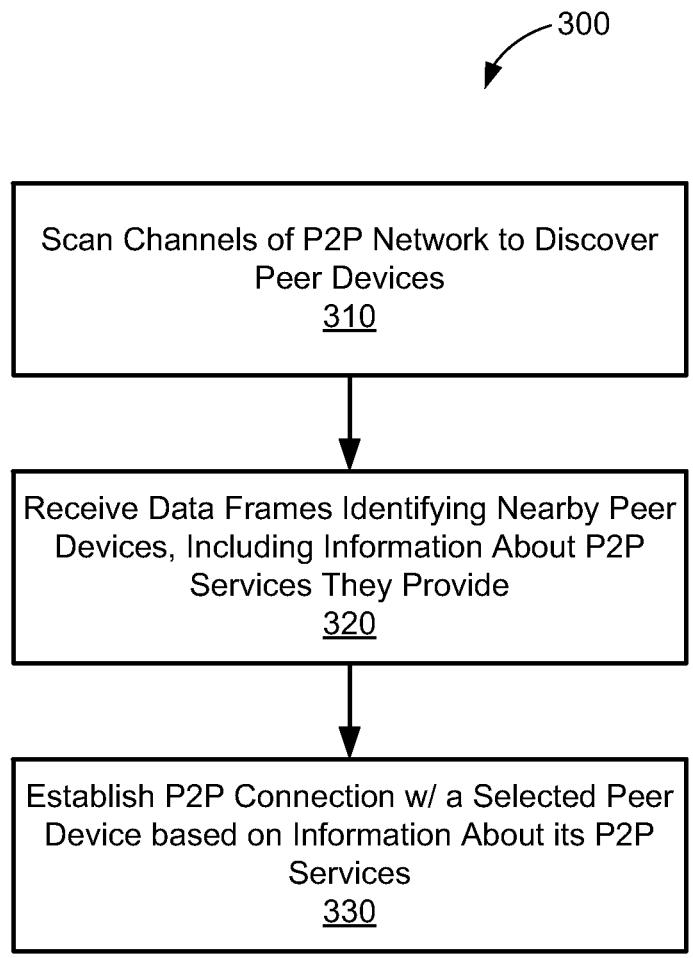
FIG. 3 is an illustrative flow chart depicting a pre-association discovery operation in accordance with some embodiments.

FIG. 3 is an illustrative flow chart depicting a pre-association discovery operation 300 in accordance with some embodiments. As described above, the present embodiments allow STAs to exchange service information during a device discovery operation, thus reducing (and potentially eliminating) the number of detailed service inquiries made by a client STA during a service discovery operation. Referring also to FIGS. 1A-1B, in the operation 300, the client STA 101 initiates a device discovery operation by scanning a P2P network to discover peer STAs (310). For example, the client STA 101 may scan the network by listening for beacon frames, and/or by broadcasting probe requests and listening for probe responses.

The client STA 101 receives data frames carrying management information and SI data from the discoverable peer STAs 102-104 (320). For some embodiments, the SI data identifies a P2P service capability of each of the peer STAs 102-104. The SI data may be encoded, for example, into beacon frames, probe response frames, and/or any other type of data frames carrying information which may be used to identify and/or locate nearby peer devices.

Then, the client STA 101 may use the SI data to establish a P2P connection with a selected one (or more) of the peer STAs 102-104 (330). For example, the SI data may include information indicating (i) whether a peer STA provides a P2P service, (ii) updates and/or changes to the P2P services provided by the STA, (iii) types of services supported by the STA, (iv) a detailed list of services that the STA is configured to provide, and/or (v) whether the STA provides a particular service requested by the STA 101. Thus, for some embodiments, the client STA 101 may use the SI data to narrow down a selection of peer STAs with which to perform a subsequent service discovery operation. In other embodiments, the client STA 101 may use the SI data to directly determine which, if any, of the peer STAs 102-104 to establish a connection with (thus foregoing the service discovery phase altogether).

Further, for some embodiments, the client STA 101 may determine whether any of the peer STAs 102-104 provides the desired services by comparing the list of supported Service Query Strings (e.g., whether hashed or not) with the Service Query String. For example, the client STA 101 may generate a hash value for its Service Query String and then determine whether there is a matching hash value in the list of hashed supported Service Query Strings contained in the SI data provided by the peer STAs 102-104.

Figure 4:
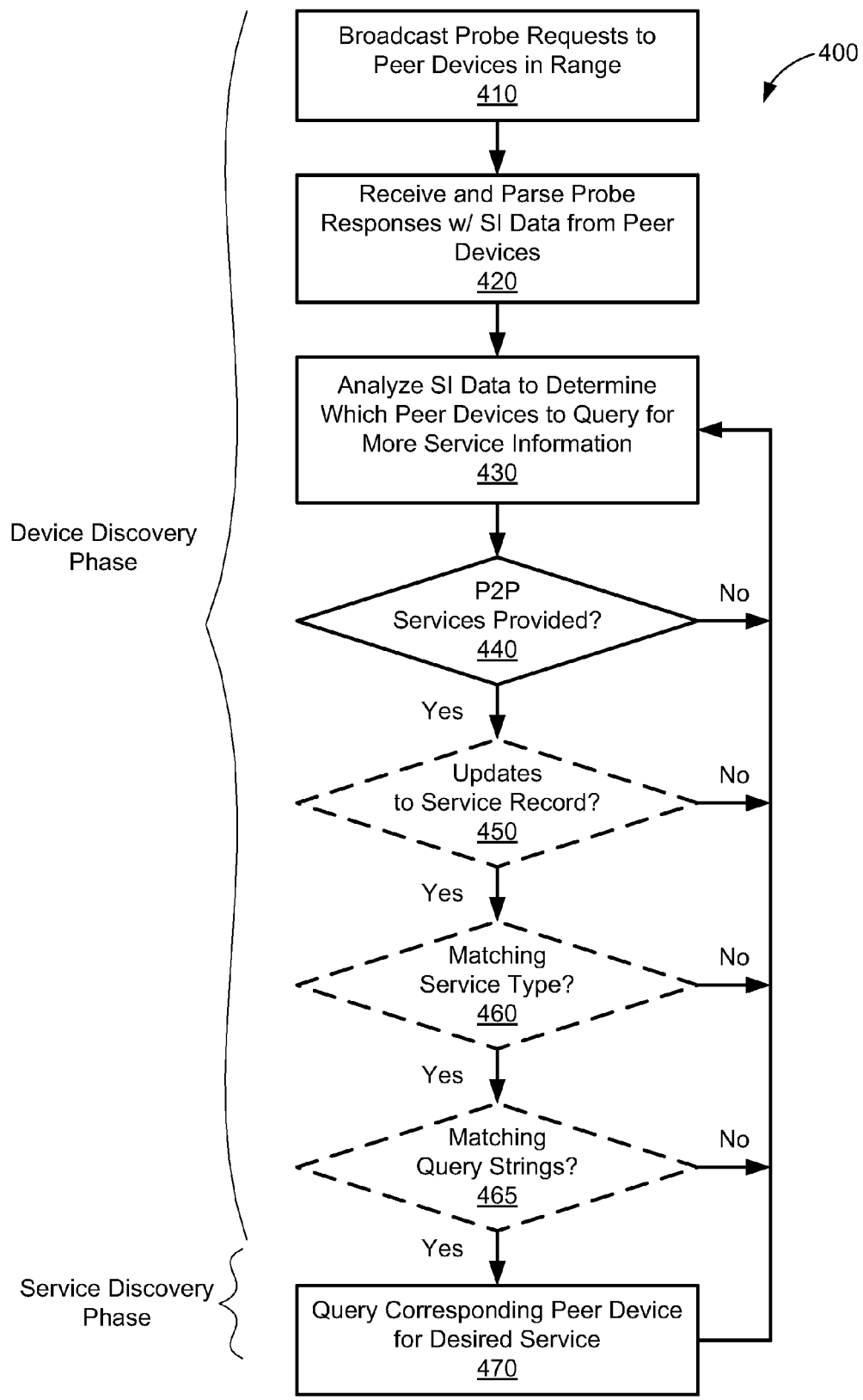
FIG. 4 is an illustrative flow chart depicting a more detailed pre-association discovery operation in accordance with some embodiments.

FIG. 4 is an illustrative flow chart depicting a more detailed embodiment of a pre-association discovery operation 400. Referring also to FIGS. 1A-1B, in the operation 400, the client STA 101 broadcasts probe requests (P_Req) to the peer STAs 102-104 (410). As mentioned above, the P_Req frames may include a list of hash values corresponding to one or more Service Query Strings that indicate which services are provided by the client STA 101. The peer STAs 102-104 respond to the probe requests by transmitting probe responses (P_Resp) to the client STA 101. As mentioned above, the P_Resp frames may include a list of hash values corresponding to one or more Service Query Strings that indicate which services are supported by the peer STAs 102-104.

Specifically, each of the peer STAs 102-104 may encode management information and a set of SI data within each P_Resp frame transmitted to the client STA 101. The SI data includes information about the P2P services, if any, that each of the peer STAs 102-104 is configured to provide. Examples of SI data may include information indicating (i) whether a peer STA provides a P2P service, (ii) updates and/or changes to the P2P services provided by the STA, and/or (iii) types of services supported by the STA. The SI data contained in the P_Resp frames may be encoded as the aforementioned list of hash values corresponding to one or more Service Query Strings. For some embodiments, the P_Req frames may also be encoded with SI data identifying one or more P2P service capabilities of the client STA 101 (e.g., as described above, with reference to FIG. 2). The SI data contained in the P_Req frames may be encoded as the aforementioned list of hash values corresponding to one or more Service Query Strings.

The client STA 101 receives the P_Resp frames transmitted by the peer STAs 102-104 and parses each P_Resp frame for SI data pertaining to a corresponding peer (420). The client STA 101 may then analyze the SI data included with the P_Resp frames to determine which, if any, of the peer STAs 102-104 to query for additional service information (430). In the example shown in FIGS. 1A-1B, peer STA 103 is a potential candidate service provider for the client STA 101, whereas STAs 102 and 104 are not.

For some embodiments, the client STA 101 analyzes the SI data to determine which, if any, of the peer STAs 102-104 are configured to provide P2P services (440). For example, some STAs, although capable of P2P communications with other peer STAs, may not be configured to host or provide P2P services (e.g., UPnP, Bonjour, Wi-Fi display, printing, gaming, and/or file sharing services). Thus, it may be moot to query such peer STAs for a particular P2P service during a subsequent service discovery operation (e.g., in step 470), when such peer STAs do not provide any P2P services.

Further, for some embodiments, the client STA 101 may determine whether any of the peer STAs 102-104 have updated service records (450). For example, a client STA may already have knowledge of one or more P2P services provided by a peer STA due to a prior association and/or device discovery operation performed with that peer (e.g., based on data stored in the STA table 242 of FIG. 2). Thus, it may be moot to query such peers again for a particular P2P service (e.g., in step 470), unless their services have changed.

Further, for some embodiments, the client STA 101 may determine whether any of the peer STAs 102-104 provide a type of service that matches the services provided by the client STA 101 (460). For example, a client STA that is to request a printing service may not be interested in establishing a connection with a peer STA that provides only gaming services. Thus, it may be moot to query a peer STA for a particular P2P service (e.g., in step 470) if such peer STA does not provide any services of the desired type.

Further, for some embodiments, the client STA 101 may determine whether there are any matching Supported Service Query Strings and/or corresponding hash entries for each peer STA (465). If there are matching Supported Service Query Strings and/or corresponding hash entries, then processing may continue at 470. Otherwise, processing may return to 430.

Accordingly, the client STA 101 may analyze the received SI data from each of the peer STAs 102-104 (430 and 440, and optionally 450, 460, and/or 465) until the client STA 101 determines that one of the peer STAs 102-104 (e.g., STA 103) is capable of providing P2P services and/or has finished analyzing all of the received SI data (e.g., from each of the peer STAs 102-104). In this manner, the client STA 101 may narrow down the list of potential candidates with which to initiate a subsequent service discovery operation. Specifically, the client STA 101 may select one or more of the peer STAs 102-104 with which to perform a service discovery operation based on the likelihood that the selected peers will be able to provide a useful or relevant service for the client STA 101.

The client STA 101 then queries each of the selected peer STA(s) to determine or confirm whether they provide a particular service (470). For example, the client STA 101, desiring to print a document, may determine or confirm that peer STA 103 provides printing services. The client STA 101 may then transmit a SD_Req frame to the peer STA 103 requesting a specific printing service to be used for the document that it intends to print. The peer STA 103 may respond by transmitting a SD_Resp frame to the client STA 101 indicating whether or not the peer STA 103 supports the particular printing service requested by the client STA 101. Further, the SD_Resp frame may also include a detailed list of all of the services that the peer STA 103 is configured to support.

If the SD_Resp frame indicates that the peer STA 103 supports the requested service, the client STA 101 may then establish a P2P connection with the peer STA 103 using the management information provided earlier (e.g., within the P_Resp frames). In some cases, the client STA 101 may determine that multiple peer STAs are able to provide the requested service. Thus, for some embodiments, the client STA 101 may provide a user with an option to choose which, if any, of the matching peer STAs to establish a connection with.

Figure 5:
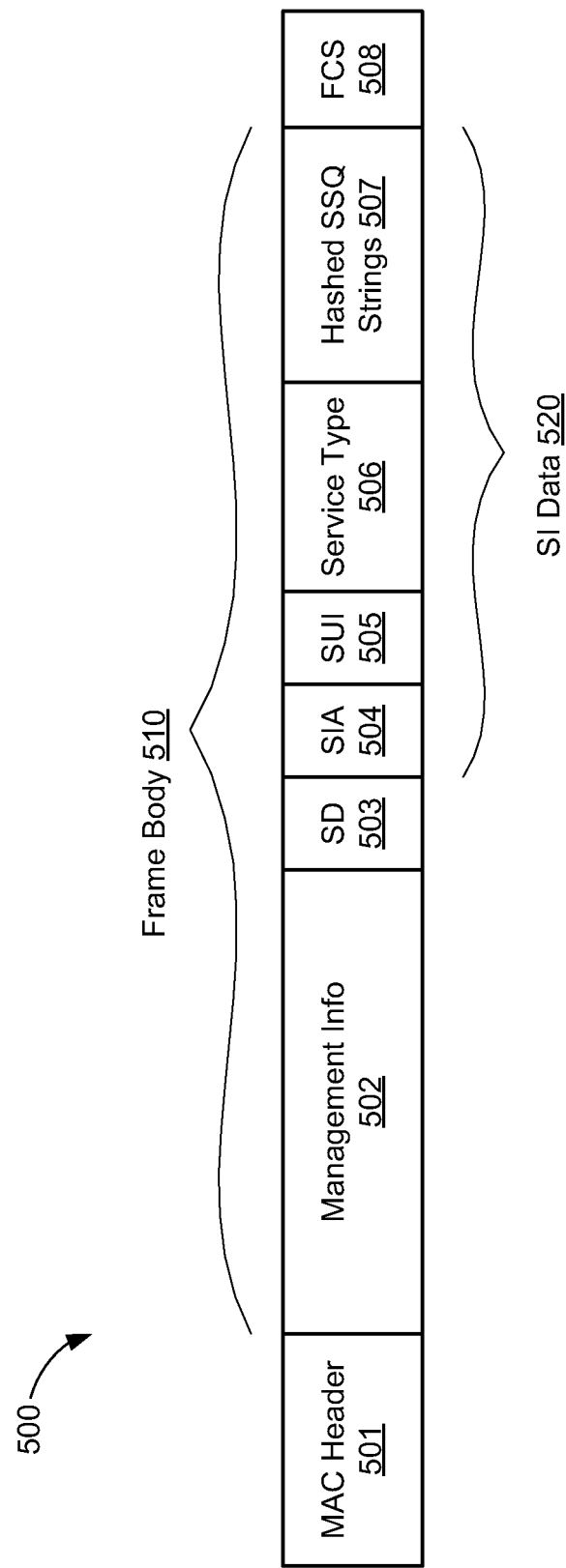
FIG. 5 shows a block diagram of a management frame in accordance with some embodiments.

FIG. 5 shows a block diagram of a management frame 500 in accordance with some embodiments. The management frame 500 may correspond to a probe response, probe request, beacon, and/or any other type of data frame (e.g., control frame or management frame) that may be exchanged between peer STAs during P2P device discovery operations. The management frame 500 includes a MAC header 501 followed by a frame body 510 and a frame check sequence (FCS) 508. The MAC header 501 may include both a destination MAC address and a source MAC address. For example, each STA is assigned a unique MAC address that is programmed therein by the manufacturer of the device. Thus, each MAC address may be used to uniquely identify the individual device. The FCS 508 may be a checksum or other suitable technique used for error detection.

The frame body 510 includes management information 502, a service discovery (SD) bit 503, and SI data 520. As discussed above, the management information 502 may include any information that may be used to locate and establish a connection with the STA from which the management frame 500 originated (e.g., such information may include a receiver MAC address and/or supported data rates). The SD bit 503 indicates whether the originating STA is capable of participating in a service discovery operation (e.g., whether the STA can transmit and/or respond to SD_Req frames). For example, activation of the SD bit 503 may indicate that the STA can perform service discovery operations. Note, however, that the SD bit 503 may not indicate whether the STA actually has P2P services to provide.

The SI data 520 includes a service information available (SIA) bit 504, a service update indicator (SUI) field 505, and a service type field 506. For at least some embodiments, the SI data 520 may also include a Hashed Supported Service Query (SSQ) Strings field 507 to store hashed or otherwise compressed information indicating all of the different service types provided by the corresponding device. The SIA bit 504 indicates whether the originating STA is configured to provide one or more P2P services. For example, activation of the SIA bit 504 may indicate that the STA is capable of providing a P2P service. As noted above, the SD bit 503 merely indicates whether the STA can perform service discovery operations. Thus, the SD bit 503 may be activated while the SIA bit 504 of the same management frame 500 is deactivated.

The SUI field 505 may store a numerical value that is incremented each time the services of the originating STA change. For example, a STA that provides a printing service may increment the value stored in its SUI field 505 if it later starts to provide a gaming service. The value stored in SUI field 505 may be incremented again if the originating STA subsequently starts providing a different kind of gaming service. As described in the embodiments above, peer STAs may look for changes in the values stored in SUI field 505 to determine whether they should perform another service discovery inquiry with the originating STA.

The service type field 506 may include a list of the types of P2P services that the originating STA is capable of providing. For example, if the STA supports multiple P2P services, the service type field 506 may specify all of the different types of P2P services that are supported (e.g., UPnP, Bonjour, Wi-Fi display, printing, gaming, file sharing, etc.). As described in the embodiments above, a STA may filter out potential candidates that do not provide a desired type of P2P service.

Further, the service type field 506 may be hashed or compressed to encode all of the different service types within the size limitations of the frame body 510. Exemplary encoding algorithms may include an array or bitmap of the service protocol types:

if the numeric value of the protocol types used by the STA is less than 8 (or 16), then a 1-octet (or 2-octect) bitmap may be used to describe the protocol types; and if the protocol types have numeric values that are greater than 8 (or 16), an array of the protocol types may be used to describe the protocol types.

More specifically, for at least one embodiment, the Hashed SSQ Strings field 507 may employ one or more of the following encoding algorithms:

if the number of supported service query strings in the SI data 520 is less than a threshold value (e.g., less than 8), then an array of hash values for each query string may be created. For example, the hash value for each query string may be created using XOR operations for all octets in the query string; and if the query service is "transactional" (e.g., the first query string is fixed, and is followed by a variable string describing the desired transaction), then only the first portion of the query string is hashed (i.e., the portion that is static and truncated). For example, a corresponding array may have entries with two fields: the length of query used to calculate the hash, and the hash of the query string truncated to the given length.

Note that the foregoing compression algorithms are provided for illustrative purposes only, and may not be necessary to implement any of the embodiments described above.

By encoding the SI data 520 into the frame body 510 of the management frame 500 (e.g., as one or more information elements), the present embodiments may be implemented with little modification to the architecture of existing P2P Wi-Fi systems. In particular, the use of probe request, probe response, and/or beacon frames to facilitate the exchange of service information allows the present embodiments to be implemented without deviating from 802.11 standards.

Figure 6A:
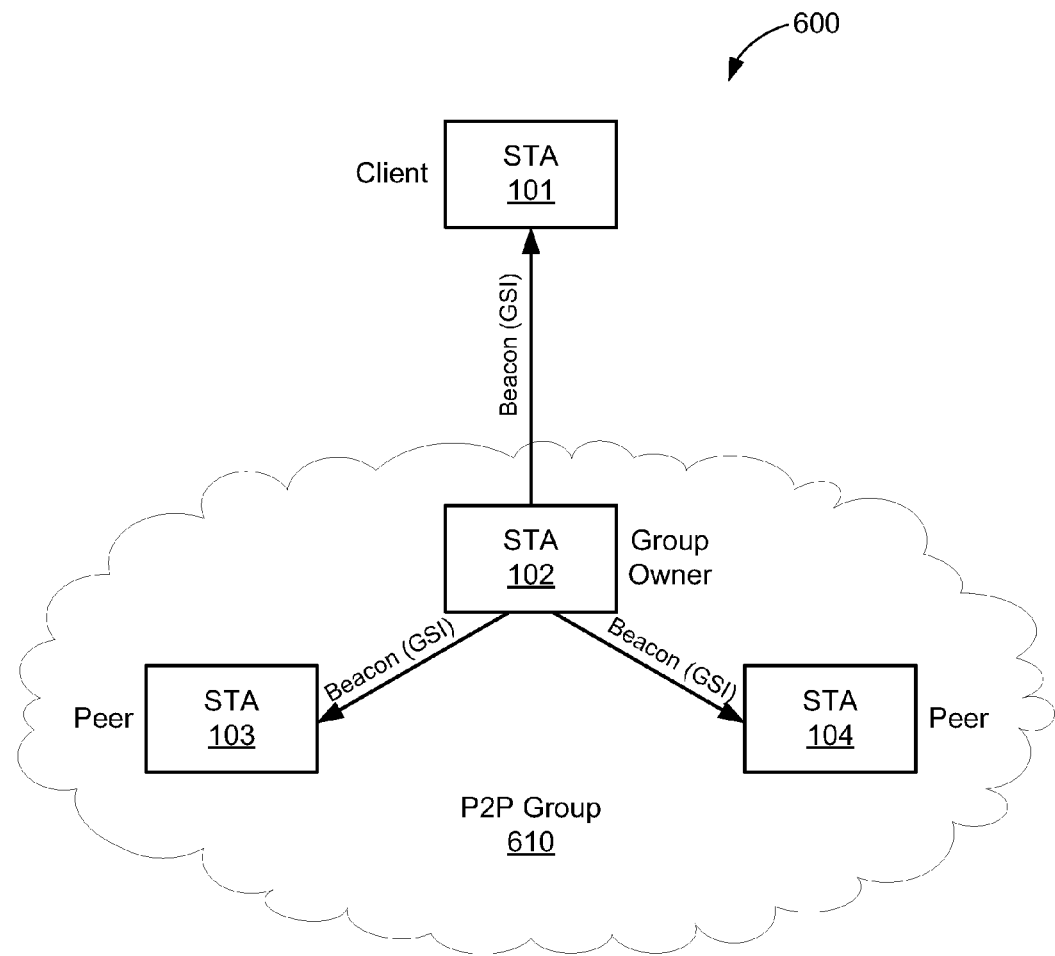
FIGS. 6A-6B depict another P2P Wi-Fi system within which the present embodiments may be implemented.
Figure 6B:
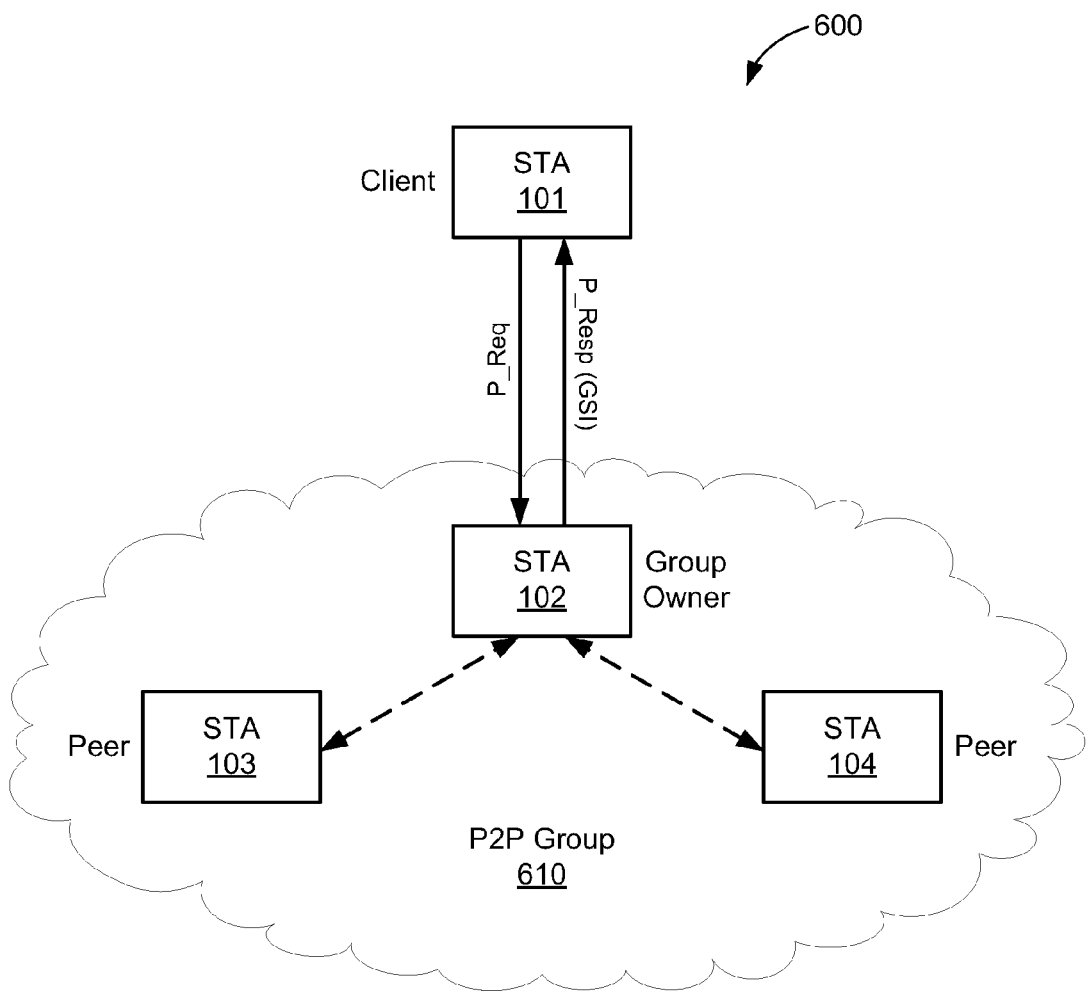

FIGS. 6A-6B depict another P2P Wi-Fi system 600 within which the present embodiments may be implemented. System 600 is shown to include the client STA 101 located within Wi-Fi communication range of a P2P group 610, which includes the peer STAs 102-104. The peer STAs 103 and 104 are connected to the P2P group 610 via the peer STA 102 (i.e., the "group owner"). Specifically, the group owner STA 102 acts as an access point through which the other peer STAs 103 and 104 may communicate. Although the P2P group 610 is shown to include only three peer STAs 102-104 for simplicity, it is to be understood that the P2P group 610 may include any number of STAs.

As group owner, the peer STA 102 may perform many of the functions that an access point performs. For example, as shown in FIG. 6A, the STA 102 may broadcast beacon frames containing group session information (GSI) at regular intervals for timing synchronization purposes. The beacon frames may also advertise operational parameters, supported capabilities, and/or membership within the P2P Group 610. Furthermore, as members of the P2P group 610, the peer STAs 103 and 104 do not respond directly to probe requests broadcast by the client STA 101. Rather, as shown in FIG. 6B, the group owner STA 102 responds to probe requests on behalf of the P2P group 610.

The client STA 101 may thus initiate a device discovery operation by listening for beacon frames broadcast by the group owner STA 102, and/or by transmitting P_Req frames to the group owner STA 102 and listening for P_Resp frames. Both the beacon and the P_Resp frames may include management information that may be used by the client STA 101 to join the P2P group 610 and/or to establish a P2P connection with individual member STAs 102-104 of the P2P group 610. In other words, the client STA 101 may discover all of the peer STAs 102-104 based on a single communication received from the group owner STA 102.

As mentioned above, the P_Req frames and/or beacon frames may include a list of hash values corresponding to one or more Service Query Strings that indicate which services are provided by the client STA 101, and the P_Resp frames may include a list of hash values corresponding to one or more Service Query Strings that indicate which services are supported by the corresponding one of peer STAs 102-103. In this manner, the client STA 101 may determine which services are supported by each of the peer STAs 102-104 prior to initiating a service discovery operation.

The client STA 101 analyzes the beacon and/or P_Resp frames to locate and identify the peer STAs 102-104, and may then initiate a service discovery operation with one or more of the peer STAs 102-104. For example, the client STA 101 may subsequently send SD_Req frames to one or more of the peer STAs 102-104 to confirm the specific services supported by corresponding peer STAs. Each of the peer STAs 102-104 responds to a received SD_Req frame, if any, by transmitting a SD_Resp frame back to the client STA 101. The client STA 101 may then analyze each of the SD_Resp frames to confirm whether a corresponding peer STA can provide the particular service that the client STA 101 is requesting. In this manner, the client STA 101 may communicate using P2P protocols with any of the members (e.g., peer STAs 102-104) of the P2P group 610 once it has discovered them.

If the client STA 101 determines that one of the peer STAs 102-104 provides the requested service, the client STA 101 may then establish a P2P connection with that peer STA using the management information provided in the P_Resp and/or beacon frames. Alternatively, the client STA 101 may use the management information to join the P2P group 610. As a member of the P2P group 610, the client STA 101 may use the services provided by any of the other members (e.g., peer STAs 102-104).

Figure 7:
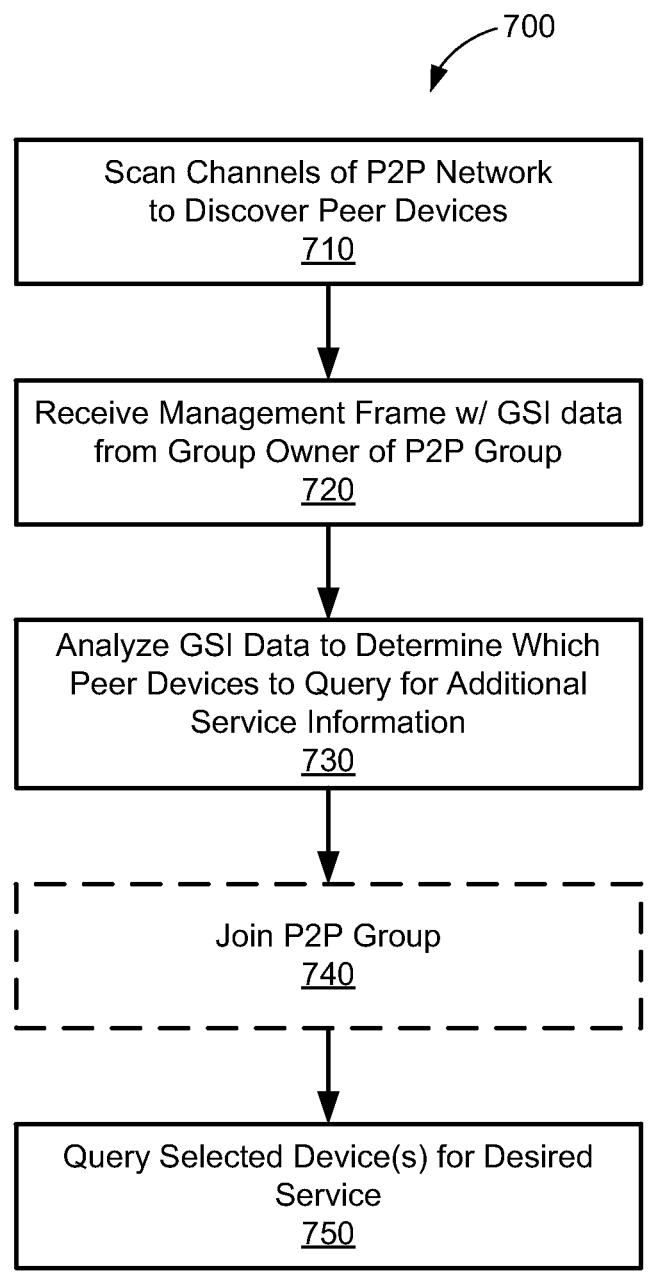
FIG. 7 is an illustrative flow chart depicting another pre-association discovery operation in accordance with some embodiments.

FIG. 7 is an illustrative flow chart depicting another pre-association discovery operation 700 in accordance with some embodiments. Referring also to FIGS. 6A-6B, in the operation 700, the client STA 101 initiates a device discovery operation by scanning the P2P network channels to discover peer STAs (710). For example, the client STA 101 may scan the network by listening for beacon frames, as shown in FIG. 6A, and/or by broadcasting probe requests and listening for probe responses, as shown in FIG. 6B.

The client STA 101 then receives a management frame from the group owner STA 102 of the P2P group 610 (720). Specifically, the management frame may include management information as well as GSI data identifying the P2P service capabilities for all of the member STAs 102-104 of the P2P group 610. Examples of GSI data may include information indicating (i) whether a group member provides a P2P service, (ii) updates and/or changes to the P2P services provided by one or more of the group members, and/or (iii) types of services supported by each group member.

The client STA 101 may analyze the GSI data included with the management frame to determine which, if any, of the peer STAs 102-104 to query for additional service information (730). For example, the client STA 101 may perform the analysis outlined above in FIG. 4 (using the GSI data) for each of the group member STAs 102-104. In this manner, the client STA 101 may narrow down the list of potential candidates with which to initiate the service discovery operation. Specifically, the client STA 101 may select one or more member STAs 102-104 of the P2P group 610 based on the likelihood that the selected group members will be able to provide services to be requested by the client STA 101.

The client STA 101 may then decide to join the P2P group 610 (740) and/or directly query one or more selected members of the P2P group 610 (750). For example, if the client STA 101 joins the P2P group 610, the client STA 101 may then query the group owner STA 102 for detailed service information pertaining to the selected members of the group 610. If the client STA 101 determines that a member of the P2P group 610 can provide the requested service, the client STA 101 may then communicate with that member to perform the desired service. In this manner, all communications between STAs would be routed through the group owner STA 102.

Alternatively, the client STA 101 may directly transmit a SD_Req frame to each of the selected group members, individually. The selected group members may thus respond by transmitting a SD_Resp frame to the client STA 101 indicating whether or not they support the particular service being requested. In addition, each SD_Resp frame may include a detailed list of all the services which the corresponding group member is configured to support. If the SD_Resp indicates that the group member can provide the requested service, the client STA 101 may establish a direct P2P connection with that particular group member using the management information received from the group owner STA 102.

Figure 8:
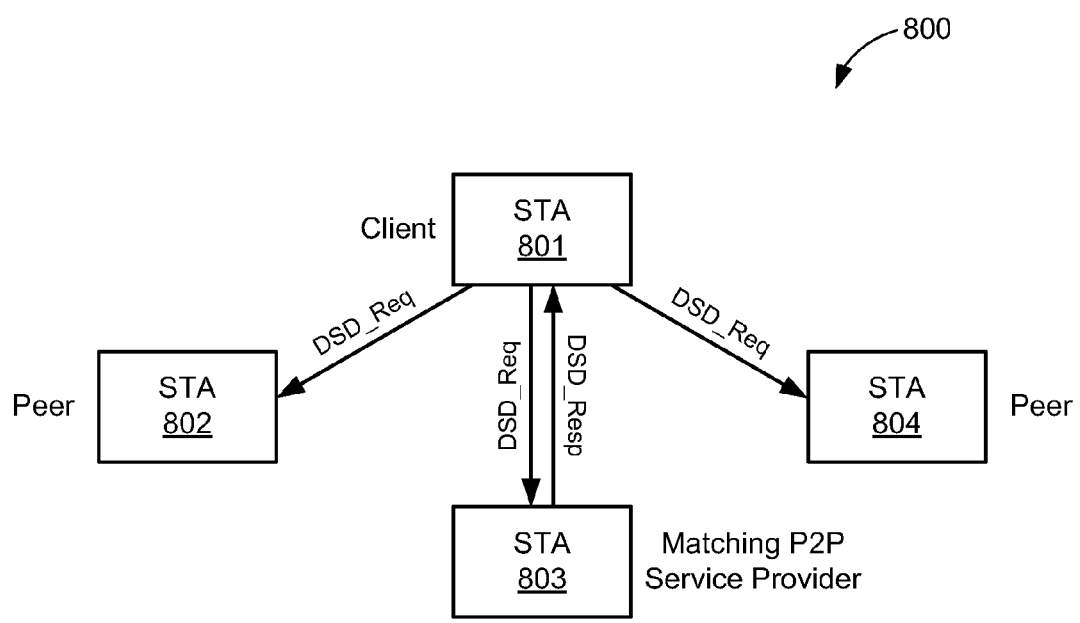
FIG. 8 depicts another embodiment of a P2P Wi-Fi system within which the present embodiments may be implemented.

FIG. 8 depicts another embodiment of a P2P Wi-Fi system 800 within which the present embodiments may be implemented. System 800 is shown to include a client STA 801 located within Wi-Fi communication range of peer STAs 802-804. Although only three peer STAs 802-804 are shown in FIG. 8 for simplicity, it is to be understood that the Wi-Fi system 800 may include any number of peer STAs. The STAs 801-804 are configured to communicate with one another in a P2P fashion, over a Wi-Fi medium. However, in contrast to the Wi-Fi system 100 of FIGS. 1A-1B, the system 800 may perform a pre-association service discovery operation without performing a device discovery operation followed by a separate service discovery operation. Specifically, the device discovery operation and the service discovery operation may be combined into a single operation. For example, rather than exchanging management frames (e.g., beacon, P_Req, and/or P_Resp) and service discovery frames (e.g., SD_Req and/or SD_Resp), the STAs 801-804 may exchange both management information and service discovery requests/responses using device and service discovery frames (e.g., DSD_Req and/or DSD_Resp).

Figure 9:
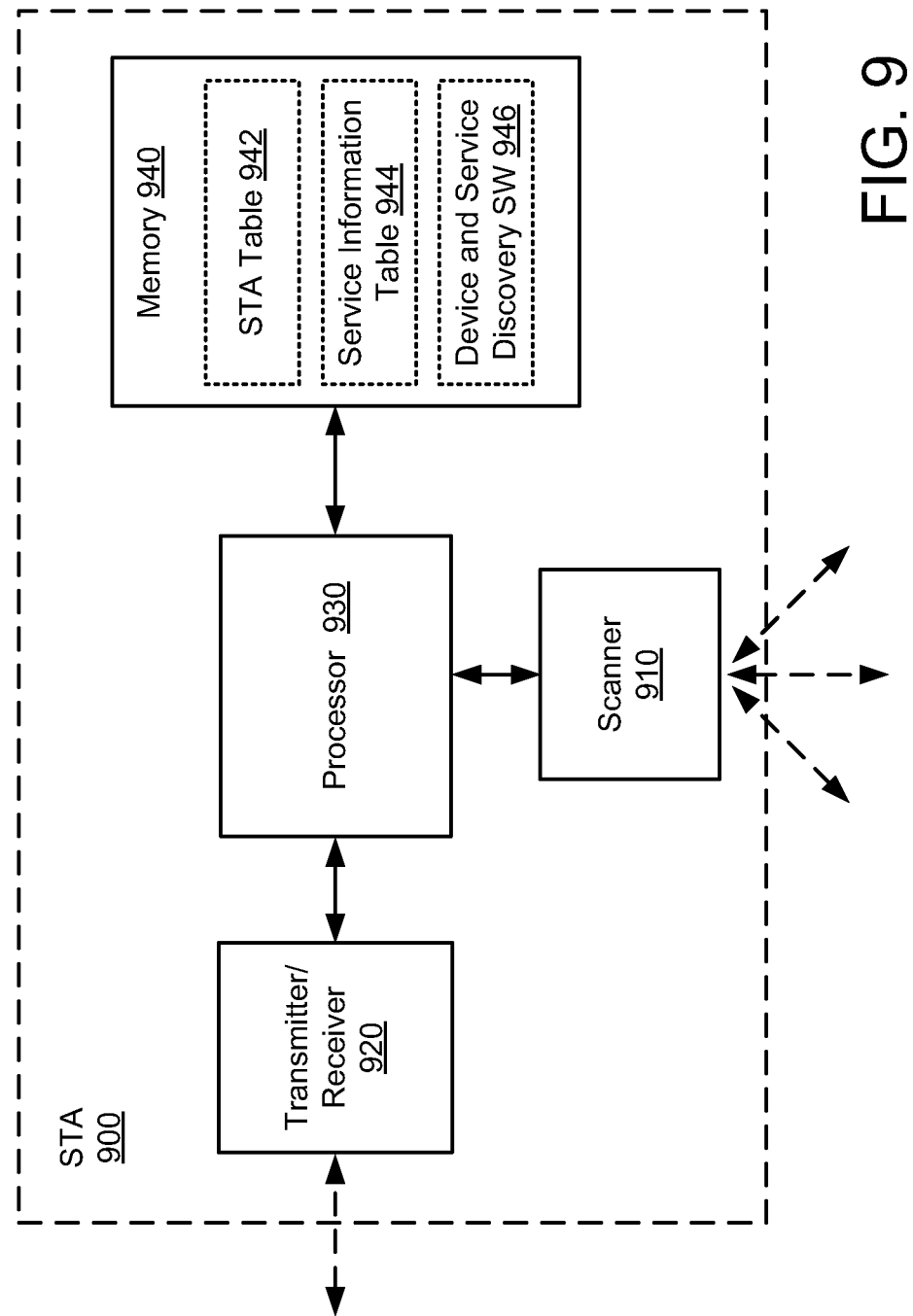
FIG. 9 shows a block diagram of another wireless STA in accordance with some embodiments.

FIG. 9 shows a STA 900 that is one embodiment of the STAs 801-804 of FIG. 8. The STA 900 includes a scanner 910, a transmitter/receiver (or "transceiver") circuit 920, a processor 930, and a memory 940. Scanner 910 may be used to scan the surrounding environment to detect and identify nearby peer STAs, for example, by periodically broadcasting DSD_Req frames and listening for DSD_Resp frames. The transceiver circuit 920 may then be used to transmit signals to and receive signals from the discovered peer STAs.

Memory 940 may include a STA table 942 that can be used as a local cache to store the MAC addresses of a plurality of peer STAs, the location coordinates of such STAs, P2P services supported by the STAs, and other suitable location or configuration information pertaining to any discovered peer STAs. For example, each entry of the STA table 942 may include a peer device field to store the name of the associated STA, an address field to store the MAC address of the STA, a coordinate field to store the location coordinates of the STA, and a service field to store information about any P2P services the STA may be configured to provide. Memory 940 may also include a service information table 944 that can be used to store service information about the STA 900. For example, the service information table 944 may include a detailed list of the services that the STA 900 is configured to support, a list of different service types supported by the STA 900, and/or information regarding updates or changes to one or more services provided by the STA 900.

Furthermore, memory 940 may also include a non-transitory computer-readable storage medium that may store the following software module:

a P2P device and service discovery software module 946 to determine the location and identity of nearby peer STAs, and to determine which, if any, of the neighboring peer STAs is capable of providing a particular service.

The software module includes instructions that, when executed by processor 930, may cause the STA 900 to perform the corresponding function. Thus, the non-transitory computer-readable storage medium of memory 940 may include instructions for performing all or a portion of the operations described with respect to FIG. 10.

Processor 930, which is coupled to the scanner 910, transceiver 920, and memory 940, may be any suitable processor capable of executing scripts of instructions of one or more software programs stored in the STA 900. For example, processor 930 may execute the P2P device and service discovery software module 946 to discover other nearby STAs and determine whether any of the STAs can provide a particular service requested by the STA 900. Specifically, the device and service discovery software module 946 as executed by processor 930 may generate DSD_Req frames to be broadcast via the scanner 910 and/or transceiver 920. The DSD_Req frames may include management information identifying one or more communication capabilities of the STA 900, as well as service query (SQ) data specifying a particular service being requested by the STA 900. The scanner 910 then listens for DSD_Resp frames sent back from neighboring peer STAs.

The device and service discovery module 946 as executed by the processor 930 may parse the received DSD_Resp frames for management information as well as for service response (SR) data, and update the STA table 942 accordingly. For some embodiments, the processor 930 may determine whether a peer STA is capable of providing the requested service simply based on the reception of a DSD_Resp frame from that peer STA. Alternatively, the processor 930, in executing the service discovery module 946, may analyze the SR data included with the DSD_Resp frames to determine which, if any, of the peer STAs is capable of providing the requested P2P service.

When the STA 900 receives a DSD_Req frame from another STA, the device and service discovery software module 946 as executed by processor 930 may parse the management information included in the DSD_Req frame to determine whether the STA 900 supports one or more types of communications specified in the DSD_Req frame. Further, the processor 930, in executing the device and service discovery software module 946, may parse the SQ data from the DSD_Req frame to determine whether the STA 900 can provide the requested service. If the STA 900 is capable of establishing a connection with the requesting STA, and is capable of providing the requested service, the device and service discovery module 946 as executed by processor 930 may generate a DSD_Resp frame to be transmitted back to the requesting device (e.g., via the scanner 910). The DSD_Resp frame may include both management information and SR data retrieved from the service information table 944. For some embodiments, no DSD_Resp frames are generated and/or transmitted if the STA 900 does not support the requested service.

Figure 10:
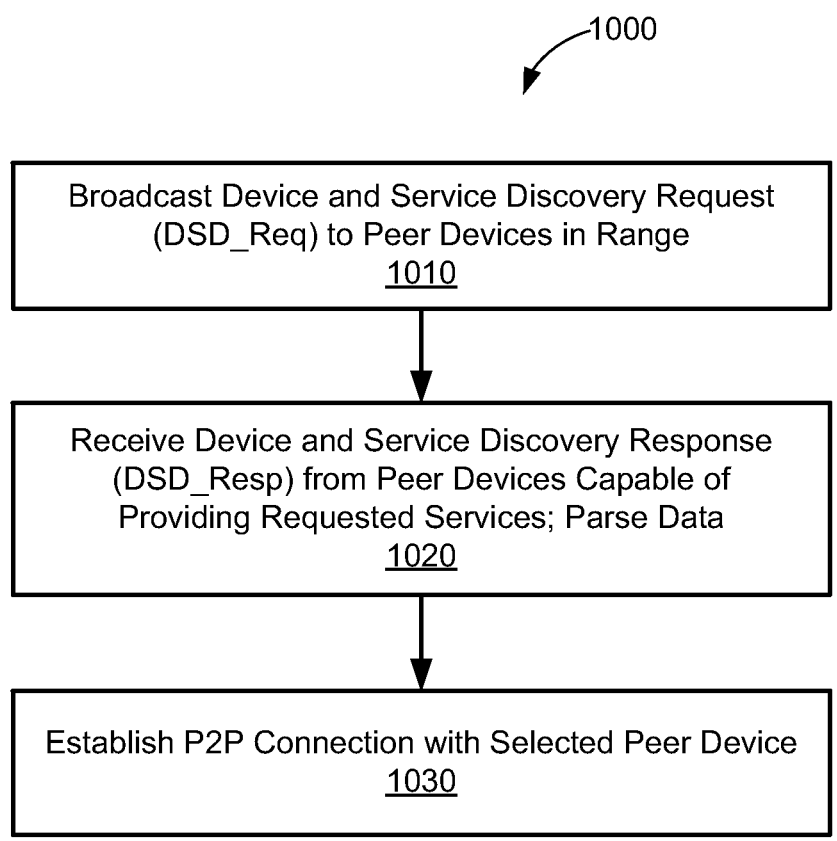
FIG. 10 is an illustrative flow chart depicting another embodiment of a pre-association discovery operation.

FIG. 10 is an illustrative flow chart depicting a pre-association discovery operation 1000 in accordance with other embodiments. As described above, the present embodiments allow STAs to exchange management information and service discovery data in a single operation, thus combining the device discovery phase and the service discovery phase of a pre-association discovery operation. Referring also to FIG. 8, in the operation 1000, the client STA 801 initiates a device and service discovery operation by broadcasting DSD_Req frames to peer STAs within Wi-Fi range, and listening for DSD_Resp frames (1010). Each DSD_Req frame may include management information and SQ data, which includes a request for a particular P2P service.

For some embodiments, only the peer STAs 802-804 that can support the requested service (e.g., STA 803) send a DSD_Resp frame to the client STA 801. Each DSD_Resp frame includes management information as well as SR data, including detailed information about the P2P services that a corresponding peer STA is configured to provide. Examples of SR data may include information indicating (i) a detailed list of the services provided by the corresponding peer STA, and/or (ii) whether or not the peer STA is capable of providing the requested service.

The client STA 801 receives the DSD_Resp frame transmitted by the peer STA 803 and parses it for management information and SR data pertaining to the peer STA 803 (1020). The client STA 801 may then analyze the SR data included with the DSD_Resp frame to determine the specific services that are supported by the peer STA 803. For some embodiments, the client STA 801 may analyze the SR data to determine which, if any, of the peer STAs can support the requested service (e.g., in cases where the peer STAs 802-804 transmit DSD_Resp frames to the client STA 801 regardless of whether or not they are able to provide the particular requested service).

Finally, the client STA 801 may establish a P2P connection with the peer STA 803 using the management information included with the DSD_Resp frame (1030). In some cases, more than one of the peer STAs 802-804 may be capable of providing the requested service. Accordingly, the client STA 801 may receive multiple DSD_Resp frames, each identifying a respective peer STA that can provide the requested service. Thus, for some embodiments, the client STA 801 may provide a user with the option to choose which, if any, of the matching peer STAs to connect to.

Figure 11:
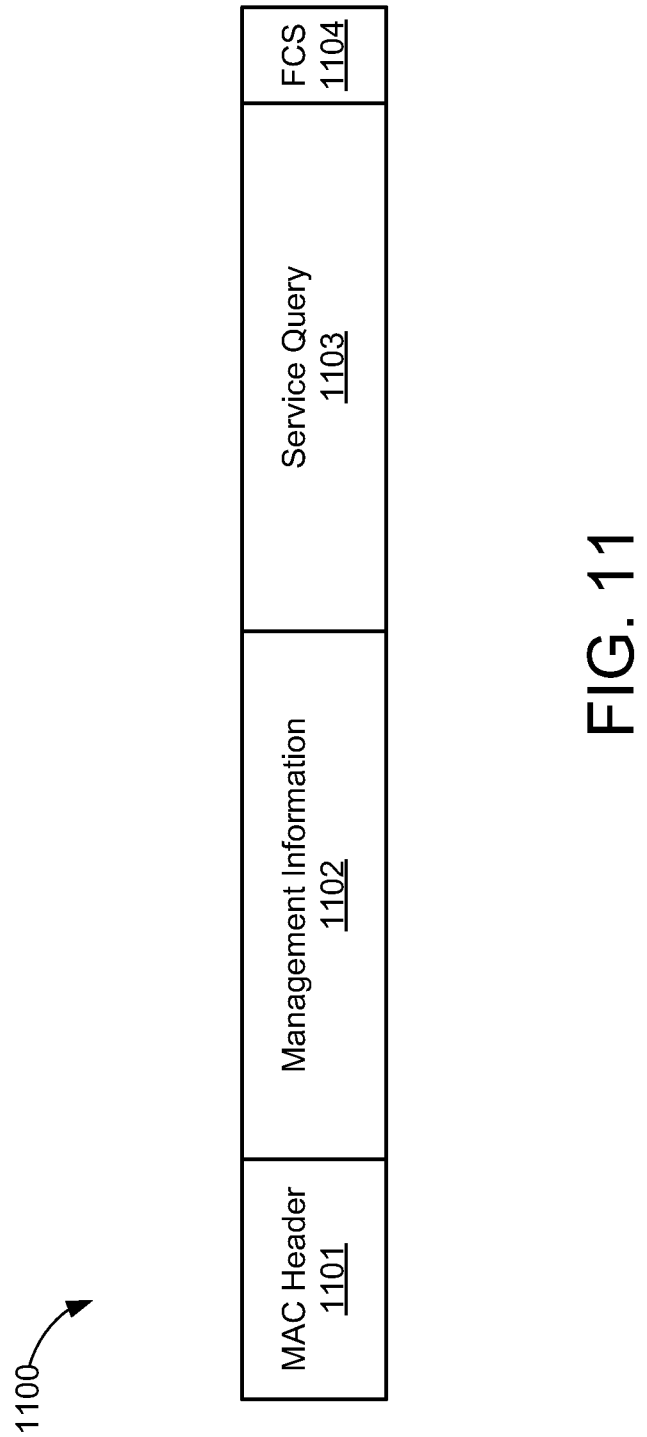
FIG. 11 shows a block diagram of a device and service discovery frame in accordance with some embodiments.

FIG. 11 shows a block diagram of a device and service discovery (DSD) frame 1100 in accordance with some embodiments. The DSD frame 1100 includes a MAC header 1101, management information 1102, service query (SQ) data 1103, and a FCS 1104. The MAC header 1101 may include both a destination MAC address and a source MAC address. The FCS 1104 may be a checksum or other suitable technique used for error detection.

The management information 1102 may include any information that may be used to locate and establish a connection with the STA from which the DSD frame 1100 originated (e.g., such information may include a receiver MAC address and/or supported data rates). The SQ data may include a detailed list of the services that the originating STA is configured to provide. For some embodiments, the SQ data may also include a confirmation bit indicating whether the STA is capable of providing a particular requested service.

Further, the SQ data may be hashed or compressed to enable all of the different services supported by a STA to be encoded within the size limitations of a Wi-Fi data frame (e.g., while preserving space for management information 1102). Exemplary encoding algorithms may include:
- if the number of services in the SQ data is low (e.g., less than 8), an array of hash values for each service query is created. For example, the hash value for each service query may be created using XOR operations for all octets in the query string.
- if the query service is "transactional" (e.g., the first query string is fixed, and is followed by a variable string describing the desired transaction), only the first portion of the query string is hashed (i.e., the portion that is static and truncated). For example, a corresponding array may have entries with two fields: the length of query used to calculate the hash, and the hash of the query string truncated to the given length.

The present embodiments may provide several advantages over existing pre-association service discovery operations. For example, by including SI data within Wi-Fi management frames (e.g., probe request, probe response, and/or beacon frames), the present embodiments enable a client STA to narrow its search for the provider of a particular service during the device discovery phase of a P2P pre-association operation. Accordingly, the client device may also perform subsequent service discovery operations in a faster and more efficient manner. Furthermore, by broadcasting SQ data with the management information, during the device discovery phase, the client STA is able to obtain a complete listing of service information from any peer STA that is capable of providing a requested service without having to subsequently perform multiple service discovery operations.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense. For example, the method steps depicted in the flow charts of FIGS. 3, 4, 7, and/or 10 may be performed in other suitable orders and/or multiple steps may be combined into a single step.

What is claimed is:

1. A method of operating a client device in a peer-to-peer (P2P) network, the method comprising:
    during a device discovery phase,
        scanning one or more channels of the P2P network to discover a presence of one or more peer devices by broadcasting a probe request to the peer devices, the probe request including a number of first hash values indicating a number of P2P services provided by the client device; and
        receiving a first frame from each of a number of the peer devices, wherein each first frame includes (i) management information to establish a P2P connection with a corresponding peer device and (ii) service information indicating a number of P2P services supported by the corresponding peer device; and
    during a service discovery phase, sending a service discovery request to a selected peer device based, at least in part, on the service information, wherein the service discovery request is to request one or more specific P2P services.

2. The method of claim 1, wherein the client device is to send the service discovery request to the selected peer device only if the selected peer device indicates, in the service information, support for the one or more specific P2P services.

3. The method of claim 1, wherein at least one of the first frames comprises a probe response.

4. The method of claim 3, wherein the probe response includes a number of second hash values indicating the P2P services supported by the corresponding peer device.

5. The method of claim 4, wherein the client device is to compare the first hash values with the second hash values to determine whether the corresponding peer device supports the P2P services to be requested by the client device.

6. The method of claim 1, wherein the specific P2P services include one or more of the following: a universal plug-and-play service, a Bonjour service, a Wi-Fi display service, a printing service, a game service, and a file sharing service.

7. The method of claim 1, wherein the scanning is performed by listening for beacon frames broadcast from the corresponding peer device, and wherein the first frames comprise the beacon frames.

8. The method of claim 7, wherein at least one of the beacon frames includes a number of hash values indicating the P2P services supported by the corresponding peer device.

9. The method of claim 1, wherein the one or more peer devices comprise a P2P group, and wherein a respective one of the first frames comprises a beacon frame broadcast by a group owner of the P2P group.

10. The method of claim 9, wherein the service information indicates whether one or more members of the P2P group are configured to provide the one or more specific P2P services.

11. The method of claim 1, wherein the service information indicates one or more updates to the P2P services supported by the corresponding peer device.

12. The method of claim 11, further comprising:
transmitting a service discovery request frame only to the peer devices indicating the one or more updates to the P2P services.

13. A non transitory computer-readable storage medium containing program instructions that, when executed by a processor of a client device associated with a peer-to-peer (P2P) network, cause the client device to:
during a device discovery phase,
scan one or more channels of the P2P network to discover a presence of one or more peer devices by broadcasting a probe request to the peer devices, the probe request including a number of first hash values indicating a number of P2P services provided by the client device; and
receive a first frame from each of a number of the peer devices, wherein each first frame includes (i) management information to establish a P2P connection with a corresponding peer device and (ii) service information indicating a number of P2P services supported by the corresponding peer device; and
during a service discovery phase, sending a service discovery request to a selected peer device based, at least in part, on the service information, wherein the service discovery request is to request one or more specific P2P services.

14. The non transitory computer-readable storage medium of claim 13, wherein the client device is to send the service discovery request to the selected peer device only if the selected peer device indicates, in the service information, support for the one or more specific P2P services.

15. The non transitory computer-readable storage medium of claim 13, wherein the first frames comprise probe responses.

16. The non transitory computer-readable storage medium of claim 15, wherein at least one of the probe responses includes a number of second hash values indicating the P2P services supported by the corresponding peer device.

17. The non transitory computer-readable storage medium of claim 16, wherein the client device is to compare the first hash values with the second hash values to determine whether the corresponding peer device supports the P2P services to be requested by the client device.

18. The non transitory computer-readable storage medium of claim 13, wherein the specific P2P services include one or more of the following: a universal plug-and-play service, a Bonjour service, a Wi-Fi display service, a printing service, a game service, and a file sharing service.

19. The non transitory computer-readable storage medium of claim 13, wherein execution of the program instructions to scan cause the client device to:
listen for beacon frames broadcast from the corresponding peer device, wherein the first frames comprise the beacon frames.

20. The non transitory computer-readable storage medium of claim 19, wherein at least one of the beacon frames includes a number of hash values indicating the P2P services supported by the corresponding peer device.

21. The non transitory computer-readable storage medium of claim 13, wherein the one or more peer devices comprise a P2P group, and wherein a respective one of the first frames comprises a beacon frame broadcast by a group owner of the P2P group.

22. The non transitory computer-readable storage medium of claim 21, wherein the service information indicates whether one or more members of the P2P group are configured to provide the one or more specific P2P services.

23. The non transitory computer-readable storage medium of claim 13, wherein the service information indicates one or more updates to the P2P services supported by the corresponding peer device.

24. The non transitory computer-readable storage medium of claim 23, wherein execution of the program instructions further cause the client device to:
transmit a service discovery request frame only to the peer devices indicating the one or more updates to the P2P services.

25. A client device associated with a peer-to-peer (P2P) network, the client device comprising:
means for scanning one or more channels of the P2P network to discover a presence of one or more peer devices by broadcasting a probe request to the peer devices, the probe request including a number of first hash values indicating a number of P2P services provided by the client device;
means for receiving a first frame from each of a number of the peer devices, wherein each first frame includes (i) management information to establish a P2P connection with a corresponding peer device and (ii) service information indicating a number of P2P services supported by the corresponding peer device; and
means for sending a service discovery request to a selected peer device based, at least in part, on the service information, wherein the service discovery request is to request one or more specific P2P services.

26. The client device of claim 25, wherein the client device is to send the service discovery request to the selected peer device only if the selected peer device indicates, in the service information, support for the one or more specific P2P services.

27. The client device of claim 25, wherein at least one of the first frames comprises a probe response.

28. The client device of claim 27, wherein the probe response includes a number of second hash values indicating the P2P services supported by the corresponding peer device.

29. The client device of claim 28, wherein the client device is to compare the first hash values with the second hash values to determine whether the corresponding peer device supports the P2P services to be requested by the client device.

30. The client device of claim 25, wherein the scanning is performed by listening for beacon frames broadcast from the corresponding peer device, and wherein the first frames comprise the beacon frames.

31. The client device of claim 30, wherein at least one of the beacon frames includes a number of hash values indicating the P2P services supported by the corresponding peer device.

32. The client device of claim 25, wherein the one or more peer devices comprise a P2P group, and wherein a respective one of the first frames comprises a beacon frame broadcast by a group owner of the P2P group.

33. A client device associated with a peer-to-peer (P2P) network, the client device comprising:
- a transceiver to exchange data with one or more peer devices; and
- a processor to:
  - during a device discovery phase,
    - transmit a probe request to the one or more peer devices, wherein the probe request includes first service information identifying a number of P2P services provided by the client device, the first service information comprising a number of first hash values identifying the number of P2P services provided by the client device; and
    - receive a probe response from each of a number of the peer devices, wherein each probe response includes (i) management information to establish a P2P connection with a corresponding peer device and (ii) second service information identifying a number of P2P services supported by the corresponding peer device; and
  - during a service discovery phase,
    - send a service discovery request to a selected peer device based on the second service information, wherein the service discovery request is to request one or more specific P2P services.

34. The client device of claim 33, wherein the client device is to send the service discovery request to the selected peer device only if the selected peer device indicates, in the probe response, support for the one or more specific P2P services.

35. The client device of claim 33, wherein the second service information comprises a number of second hash values identifying the P2P services supported by the corresponding peer device.

36. The client device of claim 35, wherein the client device is to compare the first hash values with the second hash values to determine whether the corresponding peer device supports the P2P services to be requested by the client device.

37. The client device of claim 33, wherein the specific P2P services include one or more of the following: a universal plug-and-play service, a Bonjour service, a Wi-Fi display service, a printing service, a game service, and a file sharing service.

38. The client device of claim 33, wherein the one or more peer devices comprise a P2P group.

39. The client device of claim 38, wherein the second service information indicates whether one or more members of the P2P group are configured to provide the one or more specific P2P services.

40. The client device of claim 33, wherein the second service information indicates one or more updates to the P2P services supported by the corresponding peer device.

* * * * *